(12) United States Patent
Setty et al.

(10) Patent No.: US 9,551,280 B1
(45) Date of Patent: Jan. 24, 2017

(54) SILENCER PANEL AND SYSTEM HAVING PLASTIC PERFORATED SIDE WALL

(71) Applicant: General Electric Company, Schenectady, NY (US)

(72) Inventors: Dinesh Venugopal Setty, Bangalore (IN); Laxmikant Merchant, Bangalore (IN); Javeed Iqbaluddin Mohammed, Bangalore (IN); Valery Ivanovich Ponyavin, Greenville, SC (US); Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/855,958

(22) Filed: Sep. 16, 2015

(51) Int. Cl.
*F01N 1/24* (2006.01)
*F02C 7/045* (2006.01)
*G10K 11/16* (2006.01)

(52) U.S. Cl.
CPC ............. *F02C 7/045* (2013.01); *F01N 1/24* (2013.01); *G10K 11/161* (2013.01)

(58) Field of Classification Search
CPC ........... F02C 7/045; F01N 1/24; G10K 11/161
USPC ................................................. 181/214, 224
See application file for complete search history.

(56) References Cited

U.S. PATENT DOCUMENTS

| | | | |
|---|---|---|---|
| 5,394,786 A | 3/1995 | Gettle et al. | |
| 5,979,595 A * | 11/1999 | Harris | F04D 29/4213 181/214 |
| 8,307,947 B2 * | 11/2012 | Bussow | F16L 55/0331 181/212 |
| 8,579,074 B2 * | 11/2013 | Kosaka | F02C 7/045 181/214 |
| 2002/0050418 A1 * | 5/2002 | Jenvey | F01N 1/24 181/224 |
| 2005/0045416 A1 * | 3/2005 | McCarty | B01F 5/0453 181/224 |
| 2006/0272886 A1 * | 12/2006 | Mueller | F02C 7/045 181/224 |
| 2010/0077755 A1 * | 4/2010 | Jangili | F01D 25/30 60/725 |
| 2013/0168180 A1 * | 7/2013 | Merchant | F02C 7/045 181/214 |

* cited by examiner

*Primary Examiner* — Forrest M Phillips
(74) *Attorney, Agent, or Firm* — Ernest G. Cusick; Hoffman Warnick LLC

(57) ABSTRACT

A silencer panel includes an acoustic absorbing material; and an enclosure surrounding the acoustic absorbing material. The enclosure includes at least one plastic, perforated side wall.

19 Claims, 6 Drawing Sheets

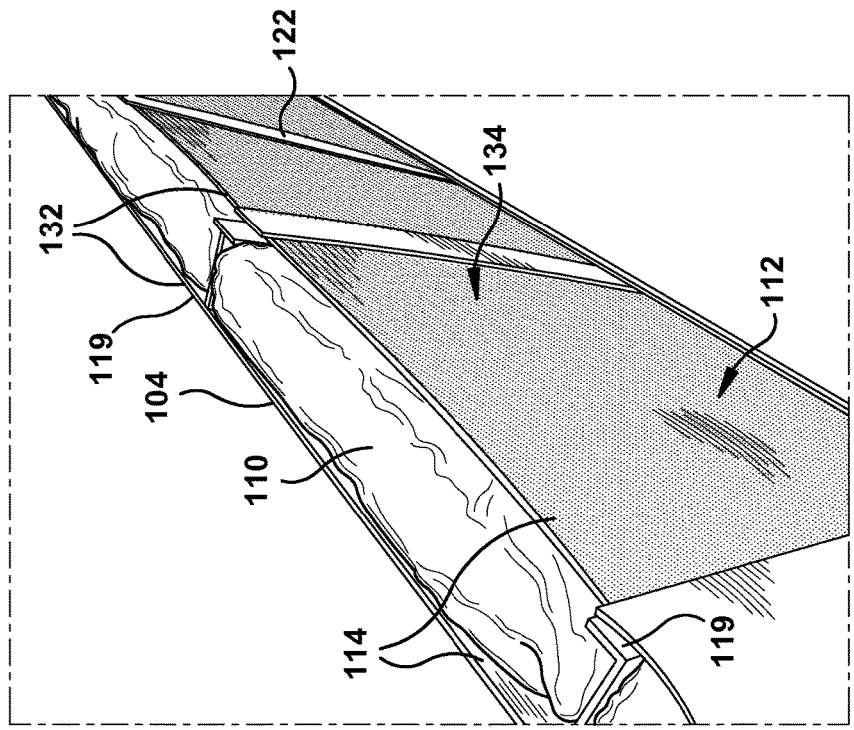
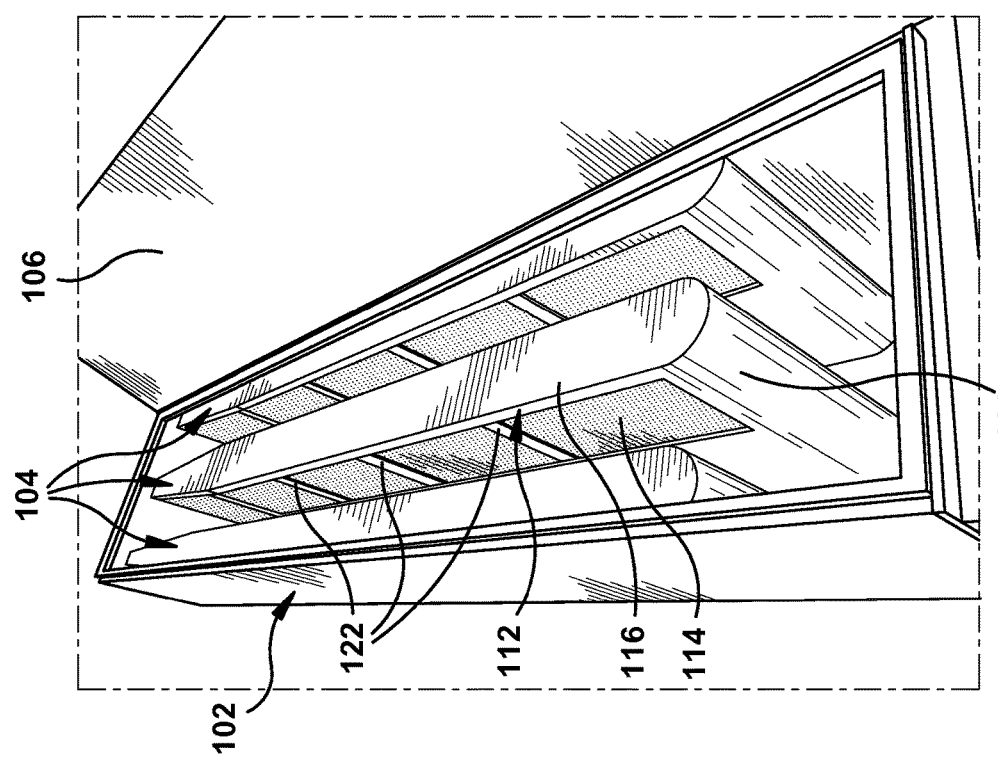

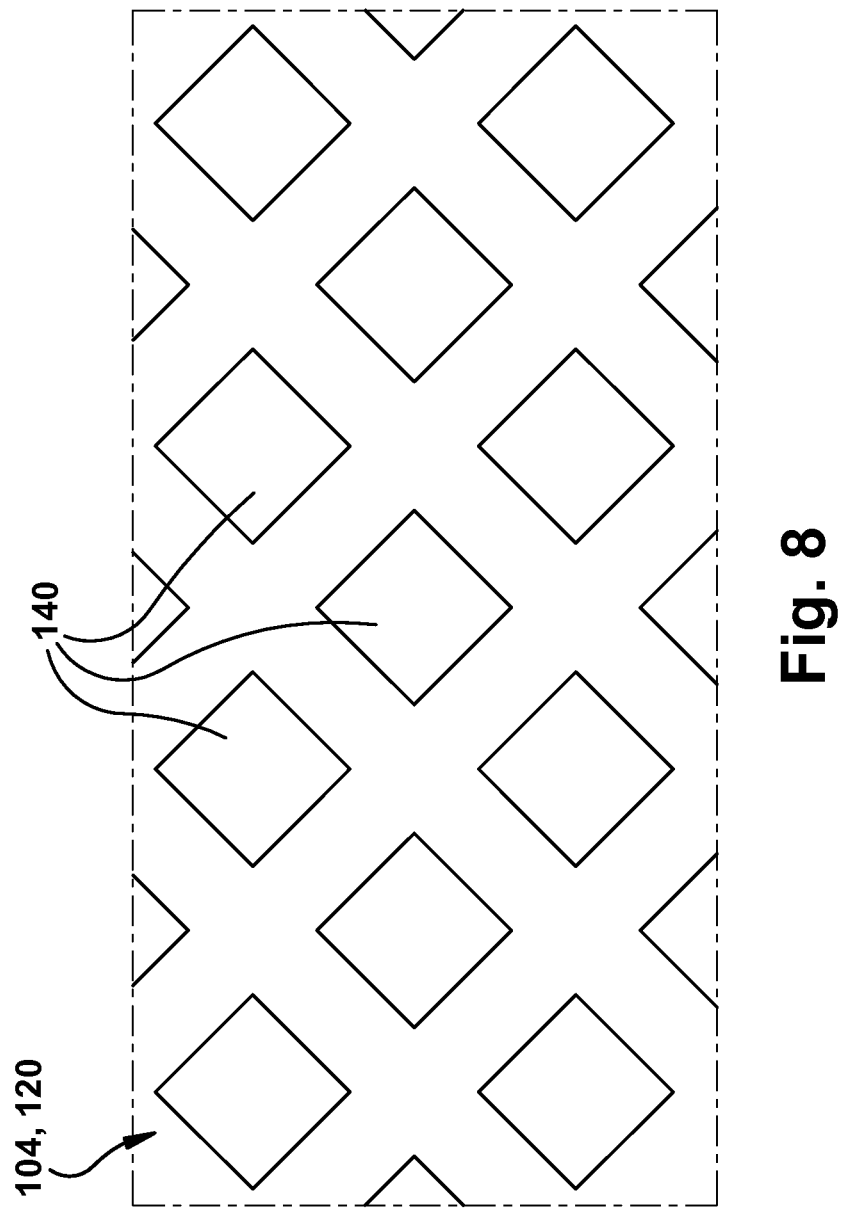

SILENCER PANEL AND SYSTEM HAVING PLASTIC PERFORATED SIDE WALL

BACKGROUND OF THE INVENTION

The disclosure relates generally to acoustic attenuation, and more particularly, to a silencer panel and system including an enclosure having at least one plastic perforated side wall.

Noise reduction systems are used on a large variety of industrial machines such as turbomachines to reduce the acoustic impact to surrounding areas. In gas turbine systems, for example, noise reduction systems may be employed in the inlet duct, gas turbine enclosures and barrier walls. Traditionally, to attain the necessary acoustic reduction requirements, silencer panels and acoustically treated walls are used in the noisy areas. One mechanism to reduce acoustic impact is to treat walls with acoustic absorbing material. Another mechanism is to place silencer panels in areas where noise reduction is required, such as a working fluid flow path in an intake system duct to prevent noise escaping.

With regard to silencer panels, each panel typically includes an acoustic absorbing material such as mineral/glass wool positioned by a metal supporting member and surrounded by an enclosure including stainless steel perforated sheets on the sides thereof. The sheets are held together by stainless steel end caps. The stainless steel perforated sheets are typically welded to the supporting members that hold the acoustic absorbing material. The perforated stainless steel sheets hold the acoustic absorbing material intact with the supporting members and propagate the sound waves through the perforations into the acoustic absorbing material. Use of stainless steel enclosures presents a number of challenges. For example, the enclosures are very heavy, and are also difficult and costly to manufacture due to the cost of the material and the need for welding to form the panels. In addition, the steel construction must be welded in place to the surrounding duct and must be custom fit for a particular sized duct.

BRIEF DESCRIPTION OF THE INVENTION

A first aspect of the disclosure provides a silencer panel comprising: an acoustic absorbing material; and an enclosure surrounding the acoustic absorbing material, the enclosure including at least one plastic, perforated side wall.

A second aspect of the disclosure provides a silencer system comprising: a frame forming a working fluid flow path; and a plurality of silencer panels positioned within the frame, each silencer panel including: an acoustic absorbing material, and an enclosure surrounding the acoustic absorbing material, the enclosure including at least one plastic, perforated side wall.

A third aspect of the disclosure provides a turbomachine inlet, comprising: an intake frame forming a working fluid flow, the intake frame operatively coupled to a compressor; a silencer system positioned within the intake frame, the silencer system including: a plurality of silencer panels positioned within the frame, each silencer panel including: an acoustic absorbing material, and an enclosure surrounding the acoustic absorbing material, the enclosure including at least one plastic, perforated side wall.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 3 shows an upper perspective view of silencer panels according to embodiments of the disclosure in position in a frame with an end panel of the frame open to reveal the silencer panels.

FIG. 4 shows an upper perspective view a single silencer panel according to embodiments of the disclosure with an end cap removed.

FIGS. 6-8 show views of various forms of perforations for the silencer panels according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a silencer panel and silencer system including at least one plastic, perforated side wall.

Figure 1:
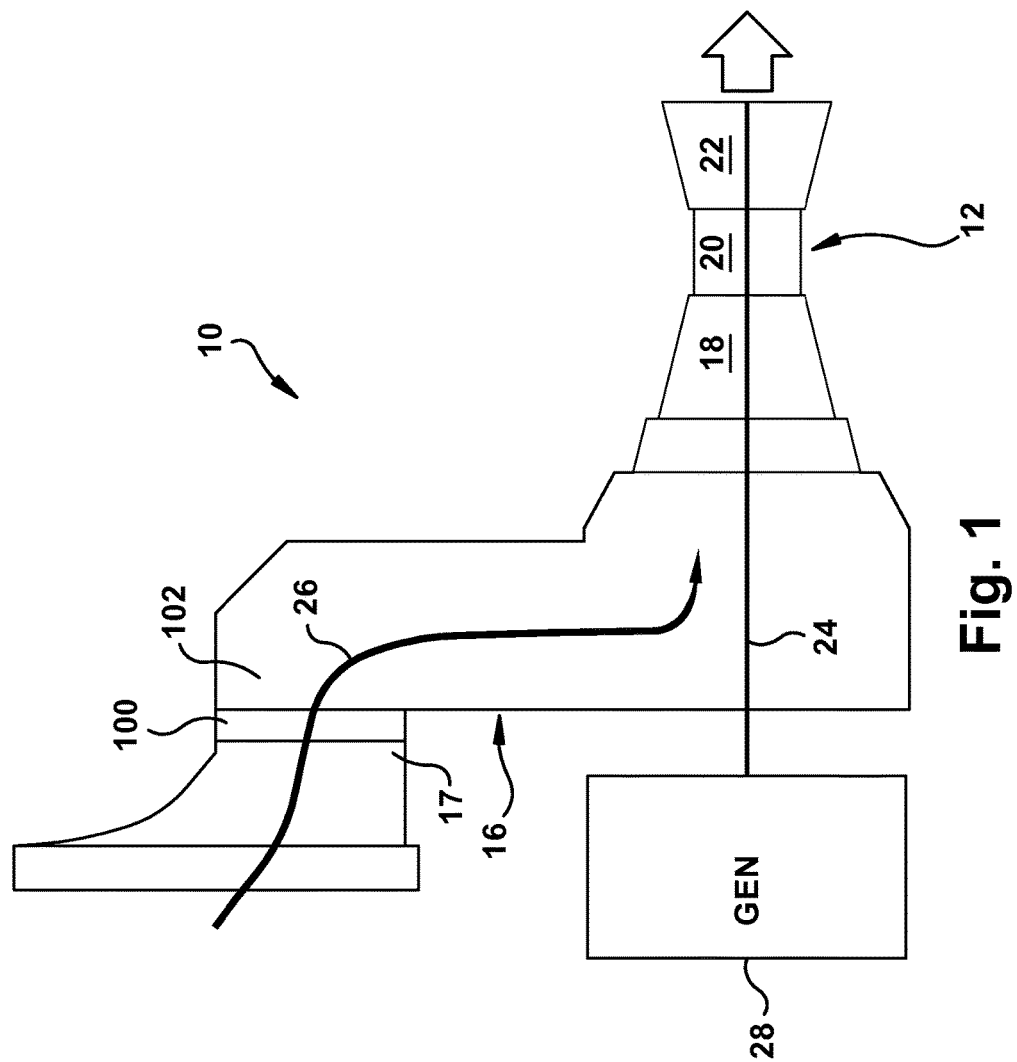
FIG. 1 shows a schematic view of an illustrative industrial machine employing a silencer panel and system according to embodiments of the disclosure.

Referring to the drawings, FIG. 1 depicts an illustrative industrial machine in the form of a turbomachine system 10 (e.g., simple cycle gas turbine power generation systems) that may include, among other things, a gas turbine system 12. Gas turbine system 12 may combust liquid or gas fuel, such as natural gas and/or a hydrogen-rich synthetic gas, to generate hot combustion gases to drive gas turbine system 12. Gas turbine system 12 includes an air intake section 16, a compressor 18, a combustor component 20, and a turbine component 22. Turbine component 22 is drivingly coupled to compressor 18 via a shaft 24. In operation, air (e.g., ambient air) enters gas turbine system 12 through air intake section 16 (indicated by arrow 26) and is pressurized in compressor component 18. Air intake section 16 may include an intake frame 17 for forming a working fluid flow therein. As illustrated, intake frame 17 is operatively coupled to compressor 18, which includes at least one stage including a plurality of compressor blades coupled to shaft 24. Rotation of shaft 24 causes a corresponding rotation of the compressor blades, thereby drawing air into compressor 18 via air intake section 16 and compressing the air prior to entry into combustor component 20.

Combustor component 20 may include one or more combustors. In embodiments, a plurality of combustors is disposed in combustor component 20 at multiple circumferential positions in a generally circular or annular configuration about shaft 24. As compressed air exits compressor component 18 and enters combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through turbine component 22 flow against and between the turbine blades, thereby driving the turbine blades and, thus, shaft 24 into rotation. In turbine component 22, the energy of the combustion gases is converted into work, some of which is used to drive compressor component 18 through rotating shaft 24, with the remainder available for useful work to drive a load such as, but not limited to, an electrical generator 28 for producing electricity, and/or another turbine. It is emphasized that turbomachine system 10 is simply illustrative of one application in which a silencer panel and system according to embodiments of the invention may be employed. As air flows through air intake system 16, noise is created such that a silencer system 100 and compressor component 18 according to embodiments of the invention is employed to reduce the noise.

Figure 2:
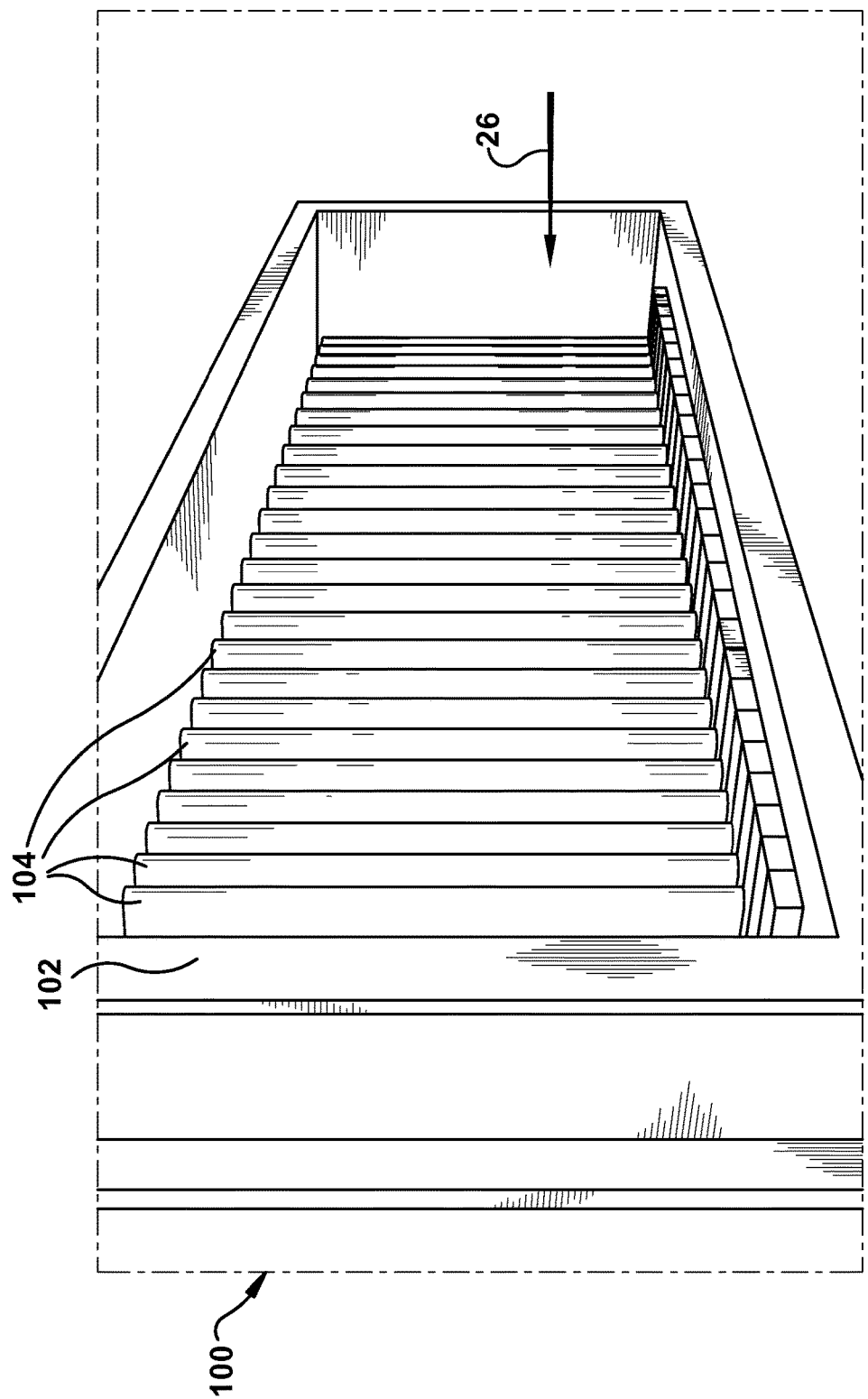
FIG. 2 shows a front perspective view of an intake system frame employing a silencer panel and system according to embodiments of the disclosure.

FIG. 2 shows front perspective view of a silencer system 100 including a frame 102 (e.g., intake frame 17 (FIG. 1)) forming a working fluid flow path or duct, and FIG. 3 shows an upper perspective view of a silencer panel 104 in position in frame 102 with an end panel 106 of frame 102 open to reveal silencer panels 104. Frame 102 may include any now known or later developed intake frame made of, for example, steel, galvanized steel or other structural metal, and sized for a particular compressor 18 (FIG. 1) and/or industrial machine. As understood, frame 102 can come in a large variety of sizes.

As shown in FIG. 2, a plurality of silencer panels 104 according to embodiments of the invention is positioned within frame 102. The panels may be evenly spaced across a width of the frame. Each silencer panel 104 may be configured to be positioned within frame 102 in a variety of ways, e.g., by fasteners such as screws through end panel 106 (FIG. 3) of frame 102, mating channels, tongue-and-groove mating elements, etc. Each silencer panel 104 may include appropriate structure to accommodate the particular type of positioning mechanism employed.

Figure 5:
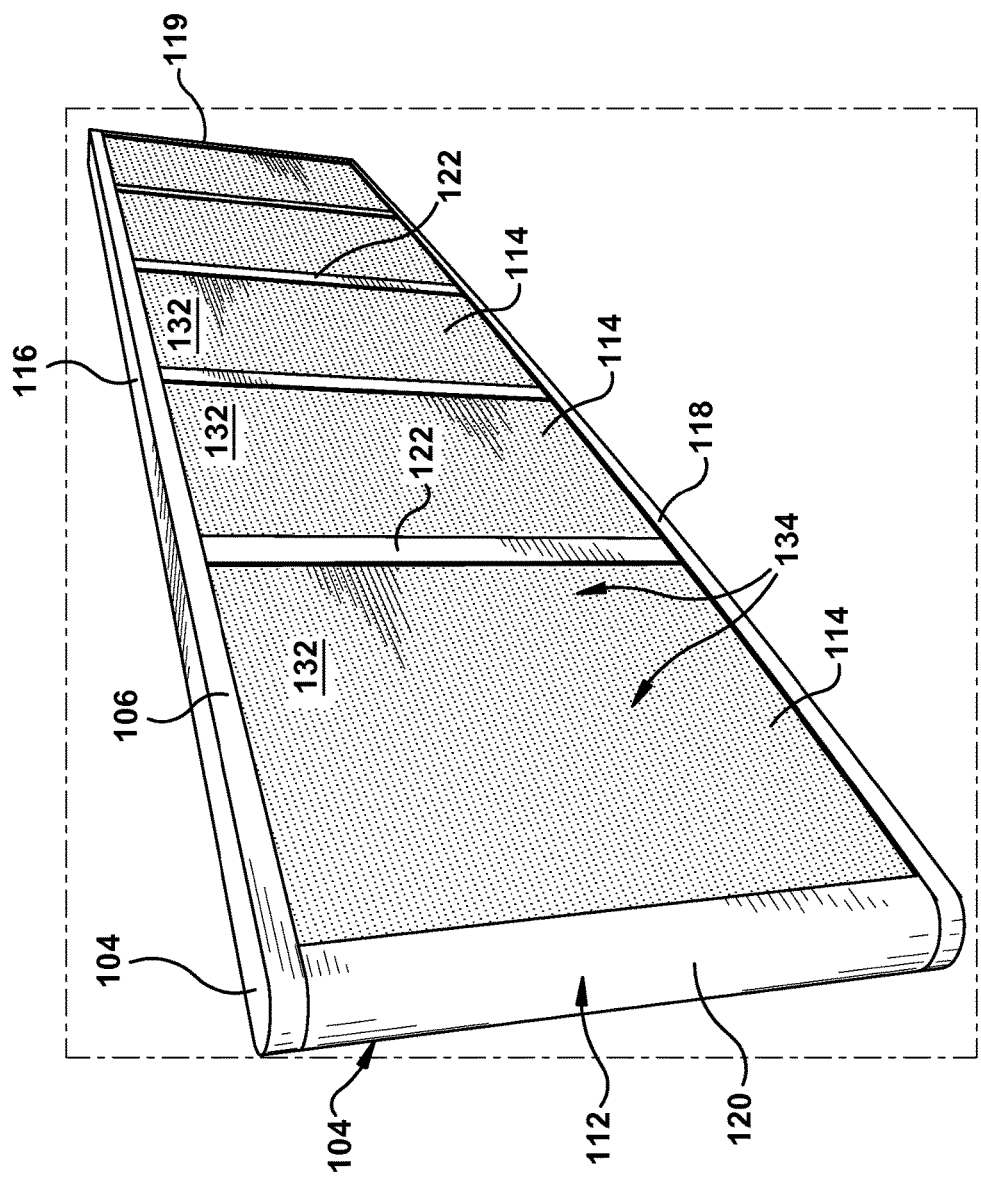
FIG. 5 shows a front perspective view of a silencer panel according to embodiments of the disclosure.

FIG. 4 shows an upper perspective view of a single silencer panel 104 with an end cap removed, and FIG. 5 shows a front perspective view of a whole single silencer panel 104. Referring to FIGS. 3-5, collectively, each silencer panel 104 includes an acoustic absorbing material 110 (FIG. 4 only) and an enclosure 112 surrounding acoustic absorbing material 110. Acoustic absorbing material 110 may include any now known or later developed sound absorbing material such as but not limited to at least one of: foam, mineral wool, rock wool and fiberglass. The foam may be reticulated, or otherwise called open cell foam. In contrast to conventional systems, enclosure 112 according to embodiments of the disclosure includes at least one plastic, perforated side wall 114. In addition, although not necessary in all instances, an upper and a lower end cap 116, 118 (FIG. 5) and side end cap 119 (FIGS. 4-5) of silencer panel 104 may also be made of the plastic. End caps 116, 118 include a panel shaped to enclose acoustic absorbing material 110 by overlapping and/or engaging side panels 114, and side end caps 119 also include a panel shaped to enclose acoustic absorbing material 110 by overlapping and/or engaging side panels 114. As an option, enclosure 112 may also include a plastic, rounded nose portion 120 (to cover or replace an upstream end cap 119), but this may not be necessary in all instances. Nose portion 120 may also be made of other materials, such as stainless steel. As shown best in FIGS. 3 and 5, enclosure 112 may also optionally include a structural support 122 positioned between adjacent portions of side walls 114, where the side wall is optionally portioned. Each structural support 122 is made of the plastic, and has a shape and size to provide structural support to side walls 114. End caps 116, 118, side walls 114, nose portion 120 and/or structural supports 122 may be coupled together in any now known or later developed fashion, e.g., fasteners such as screws or nuts/bolts, interlocking snap engagement elements, threaded inserts, welding, etc. The coupling mechanisms may also be made of plastic, if appropriate for the setting.

Figure 7:
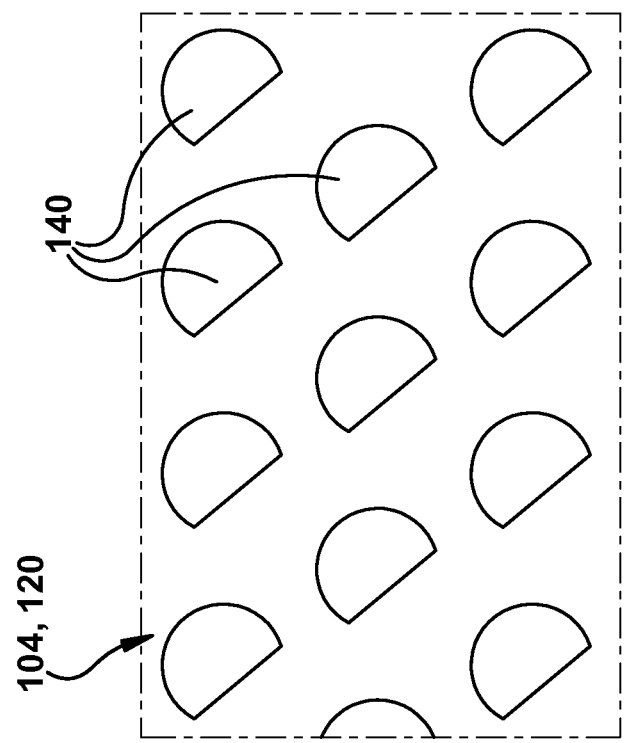
Figure 6:
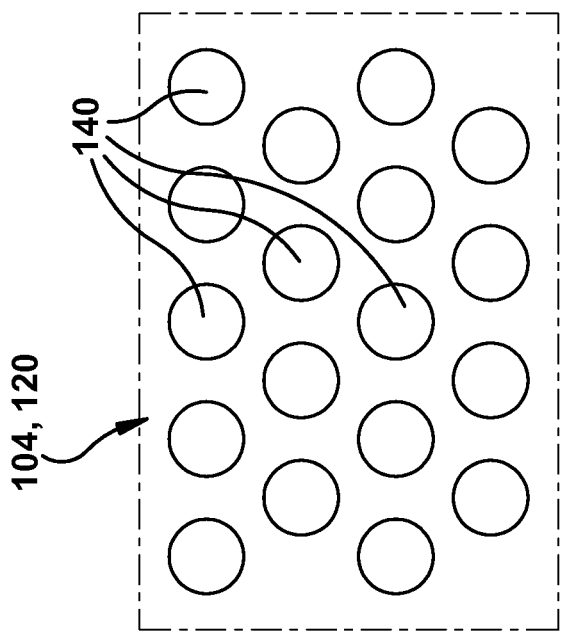

The plastic may include, for example, polyvinyl chloride (PVC), polypropylene (PP), polypropylene co-polymer (PPC), polypropylene homo-polymer (PPH), polyethylene (PE), high density polyethylene (HDPE) or any other plastic capable of withstanding the environmental and operational characteristics of the particular frame 102 (FIG. 3) and/or industrial machine in which the panel is employed. As shown in FIGS. 4 and 5 best, each plastic, perforated side wall 114 may include a planar sheet 132 of plastic having perforations 134 therein. As shown in FIG. 6, each perforation may take the form of a hole 140 extending through side wall 104. Alternatively, as shown in FIGS. 7 and 8, each perforation may include a different geometry of the openings (FIG. 7 and FIG. 8). Other shapes such as diamond, triangular, rectangular, etc. may also be possible.

Enclosure 112 made of perforated, plastic side walls 114 provides a number of advantages over conventional steel panels. For example, silencer panels 104 have reduced weight and are easier to handle, have reduced cost, and are easier to fabricate because of the elimination of extensive welding between sheets and supporting members. In addition, the plastic may provide slightly enhanced acoustic performance (e.g., a higher decibel (dB) attenuation of approximately, for example, 2 dB or above overall attenuation), and may allow increased perforation areal opening percentages compared to steel panels.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A silencer panel comprising:
an acoustic absorbing material; and
an enclosure surrounding the acoustic absorbing material, the enclosure including:
an upper end cap;
a lower end cap positioned opposite the upper end cap;
a nose portion positioned between the upper end cap and the lower end cap;
a side end cap positioned between the upper end cap and the lower end cap, the side end cap positioned opposite the nose portion; and
two plastic, perforated side walls positioned on opposite sides of the acoustic absorbing material, between the upper end cap and the lower end cap, the at least two plastic, perforated side walls axially aligned with a flow direction of a working fluid flowing over the enclosure.

2. The silencer panel of claim 1, wherein the acoustic absorbing material includes at least one of: foam, mineral wool, rock wool and fiberglass.

3. The silencer panel of claim 1, wherein a plastic of the at least one plastic, perforated side wall is chosen from the group consisting of: polyvinyl chloride (PVC), polypropylene (PP), polypropylene co-polymer (PPC), polypropylene homo-polymer (PPH), polyethylene (PE) and high density polyethylene (HDPE).

4. The silencer panel of claim 1, wherein each of the upper end cap, the lower end cap, the nose portion and the side end cap include plastic.

5. The silencer panel of claim 1, wherein the enclosure includes at least a pair of adjacent side walls and a structural support positioned between adjacent side walls, each structural support made of the plastic.

6. The silencer panel of claim 1, wherein each plastic, perforated side wall includes a planar sheet of plastic having perforations therein.

7. The silencer panel of claim 1, wherein the silencer panel is configured to be positioned in a frame.

8. A silencer system comprising:
a frame forming a working fluid flow path; and
a plurality of silencer panels positioned within the frame, each silencer panel including:
an acoustic absorbing material, and
an enclosure surrounding the acoustic absorbing material, the enclosure including:
an upper end cap;
a lower end cap positioned opposite the upper end cap;
a nose portion positioned between the upper end cap and the lower end cap;
a side end cap positioned between the upper end cap and the lower end cap, the side end cap positioned opposite the nose portion; and
two plastic, perforated side walls positioned on opposite sides of the acoustic absorbing material, between the upper end cap and the lower end cap, the at least two plastic, perforated side walls axially aligned with a flow direction of a working fluid flowing over the enclosure.

9. The silencer system of claim 8, wherein the acoustic absorbing material includes at least one of: foam, mineral wool, rock wool and fiberglass.

10. The silencer system of claim 8, wherein a plastic of the at least one plastic, perforated side wall is chosen from the group consisting of: polyvinyl chloride (PVC), polypropylene (PP), polypropylene co-polymer (PPC), polypropylene homo-polymer (PPH), polyethylene (PE) and high density polyethylene (HDPE).

11. The silencer system of claim 8, wherein each of the upper end cap, the lower end cap, the nose portion and the side end cap include caps plastic.

12. The silencer system of claim 8, wherein the enclosure includes at least a pair of adjacent side walls and a structural support positioned between adjacent side walls, each structural support made of the plastic.

13. The silencer system of claim 8, wherein each plastic, perforated side wall includes a planar sheet of plastic having perforations therein.

14. A turbomachine inlet, comprising:
an intake frame forming a working fluid flow, the intake frame operatively coupled to a compressor;
a silencer system positioned within the intake frame, the silencer system including:
a plurality of silencer panels positioned within the frame, each silencer panel including:
an acoustic absorbing material, and
an enclosure surrounding the acoustic absorbing material, the enclosure including:
an upper end cap;
a lower end cap positioned opposite the upper end cap;
a nose portion positioned between the upper end cap and the lower end cap;
a side end cap positioned between the upper end cap and the lower end cap, the side end cap positioned opposite the nose portion; and
two plastic, perforated side walls positioned on opposite sides of the acoustic absorbing material, between the upper end cap and the lower end cap, the at least two plastic, perforated side walls axially aligned with a flow direction of a working fluid flowing over the enclosure.

15. The turbomachine inlet of claim 14, wherein each of the upper end cap, the lower end cap, the nose portion and the side end cap include caps plastic.

16. The turbomachine inlet of claim 15, wherein the acoustic absorbing material includes at least one of: foam, mineral wool, rock wool and fiberglass.

17. The turbomachine inlet of claim 15, wherein a plastic of the at least one plastic, perforated side wall is chosen from the group consisting of: polyvinyl chloride (PVC), polypropylene (PP), polypropylene co-polymer (PPC), polypropylene homo-polymer (PPH), polyethylene (PE) and high density polyethylene (HDPE).

18. The turbomachine inlet of claim 15, wherein the enclosure includes at least a pair of adjacent side walls and a structural support positioned between adjacent side walls, each structural support made of the plastic.

19. The turbomachine inlet of claim 15, wherein each plastic, perforated side wall includes a planar sheet of plastic having perforations therein.

* * * * *